March 17, 1925.
T. MORRIS
1,529,707
SAFETY SUSPENSION GEAR FOR PIT CAGES, HOISTS, AND THE LIKE
Filed Nov. 21, 1923
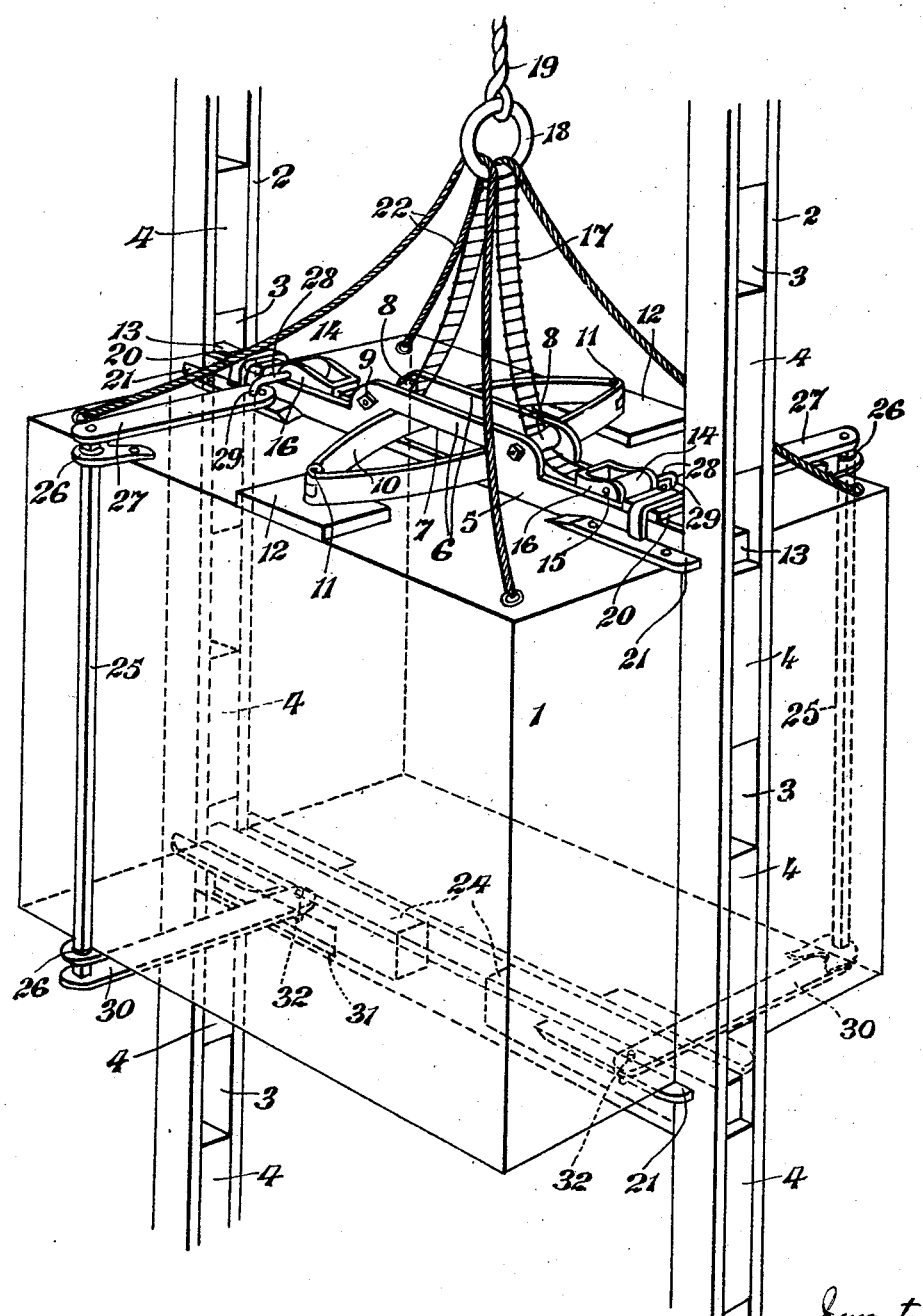

Patented Mar. 17, 1925.

1,529,707

UNITED STATES PATENT OFFICE.

THOMAS MORRIS, OF OSWESTRY, ENGLAND.

SAFETY SUSPENSION GEAR FOR PIT CAGES, HOISTS, AND THE LIKE.

Application filed November 21, 1923. Serial No. 676,122.

*To all whom it may concern:*

Be it known that I, THOMAS MORRIS, a subject of the King of Great Britain, residing at Smithfield House, Oswestry, in the county of Salop, England, have invented Improvements in Safety Suspension Gears for Pit Cages, Hoists, and the like, of which the following is a specification.

This invention comprises certain improvements in safety suspension gear for colliery and other mine or pit cages, applicable also in connection with lifts or hoists such as are used in warehouses, factories, hotels, offices, and other buildings.

More particularly the invention relates to suspension gear of the type in which the cage or hoist is provided transversely with a pair of oppositely sliding bolts, which bolts have flexible connections to the winding rope so as to be normally contracted towards each other by the weight of the cage or hoist and against spring pressure, whilst being adapted for an expansive or outward movement under the action of said spring device or devices in case of the tension of the flexible connections being removed by breakage or failure of the winding rope, the bolts by such outward expansive movement being adapted for automatic locking engagement with racks or equivalent guides extending from top to bottom of the shaft on opposite sides of the cage or hoist, to thereby prevent or arrest the descent of the cage or hoist in case of such breakage or failure of the winding rope.

According to the present invention the pair of oppositely sliding transverse bolts are provided both on the top and on the bottom of the cage or hoist, the upper pair of bolts having a chain connection to the winding rope, and the relative disposition of the lower pair of bolts being controlled, in accordance with that of the upper pair, by interconnecting shaft and link or lever devices.

The spring pressure upon the sliding bolts is provided by blade springs, the pair of springs being advantageously of bowed or arcuate formation, disposed in opposite facial relation and hinged together at their opposite extremities, with the spaced-apart inner extremities of the bolts abutting against the sides of the respective bowed springs.

In order that this invention may be clearly understood and readily carried into practice, reference may be had to the accompanying drawing, which is an elevation in perspective of my improved safety suspension gear as applied to a conventional form of pit cage.

In a convenient embodiment of the invention the cage or hoist 1 is slidable vertically between a pair of upright guide pillars 2 extending in parallel relation from top to bottom of the shaft on opposite sides of the cage, each guide pillar being of substantially rectangular cross-sectional form, with a series of uniformly spaced transverse rectangular apertures or slots 3 therein. Each guide pillar 2 is advantageously of a built-up construction, comprising a pair of flat side bar members maintained in spaced relation by a series of intermediate rectangular blocks 4, which blocks are also longitudinally and uniformly spaced to provide said transverse apertures or slots 3 in the pillar.

On the top of the cage 1 is mounted centrally and transversely, in a position directly between the upright guide pillars 2 in the shaft, a fixed channel member 5 open at the ends and top, the opposite side flanges of this channel member having raised central portions 6 in each of which is provided a rectangular longitudinal slot 7, these raised portions 6 serving also to support a transversely spaced pair of sheaves or rollers 8 rotatably mounted on pins or bolts 9 passing through the front and rear raised flange portions. Through these longitudinal slots 7 of the flanges, in a direction from front to rear of the cage, are assembled a pair of arcuate blade springs 10 disposed in opposite facial relation and hinged together at their opposite extremities, the hinge pins 11 being fixed into a pair of bearing blocks 12 mounted on the top of the cage at front and rear respectively, so that the springs 10 are supported at the desired elevation clear of the running surface of the channel member 5.

Within opposite extremities of the channel member 5, on a polished running surface thereof, are slidably mounted a pair of rectangular bolts 13, of strong and substantial construction, the spaced-apart inner extremities of these bolts 13 abutting against the respective sides of the double spring device 10, and each bolt having in an intermediate position a raised lug or boss 14 to which is pivotally connected at 15 a forked metal shoe 16 which is also disposed within or over the channel member 5. To this pair of pivoted shoes 16 are connected the opposite extremities of a suspension chain 17 of suitable construction, this chain 17 passing beneath the guide sheaves or rollers 8 of the channel member, and then passing upwardly so as to be looped through a terminal ring 18 of the winding rope 19, the arrangement being such that the cage 1 is normally suspended by the chain 17, with the sliding bolts 13 contracted towards each other, against the outward pressure of the then contracted springs 10, so as to be clear of the upright guide pillars 2 in the shaft, whilst in case of breakage or failure of the winding rope 19, the tension of the suspended chain 17 is relaxed and the bolts 13 are instantly moved outwardly in opposite directions, by expansive pressure of the springs 10, to thereby instantly and automatically engage within the nearest pair of apertures or slots 3 in the guide pillars, thereby preventing or arresting the downward movement of the cage. The cage is fitted with stops 20 to limit the outward movement of the sliding bolts, and with pairs of projecting guide fingers 21 cooperating with the sides of the upright guide pillars 2 to ensure exact alignment of the channel member 5 with the guide pillars. The extremities of the longitudinal slots 7 in the channel flanges also serve as stops to limit the outward expansive movement of the springs 10.

A pair of short auxiliary suspension ropes 22 are also connected to the corners of the cage, each of these auxiliary ropes being loosely looped through the terminal ring 18 of the winding rope, and the lengths of these auxiliary ropes being so arranged as to prevent undue compression of the spring device when the suspension chain 17 and sliding bolts 13 are in normal operation.

Beneath the cage 1 is mounted centrally and transversely a more or less similar fixed channel member 23, having a similar opposite pair of sliding bolts 24, and either with or without a similar intermediate springs device (not shown) cooperating with said bolts. The cage is also fitted in front and rear, towards opposite sides respectively, with a pair of upright shafts 25, rotatably mounted in fixed bearings 26 on the cage, each rotatable shaft 25 carrying at its upper extremity a radius link or lever 27 having a spindle 28 and swivel pin connection 29 to the upper sliding bolt 13 at its respective side of the cage, and carrying at its lower extremity a similar radius link or lever 30 passing through a slot 31 in the side flange of the lower channel member 23 and having a swivel pin connection 32 to the lower sliding bolt 24 at its respective side of the cage. By this means the lower pair of sliding spring lock bolts 24 are automatically controlled in accordance with the positions and movements of the upper pair of bolts 13, thereby ensuring simultaneous and uniform action of the entire series of sliding spring locking bolts.

What I claim as my invention and desire to secure by Letters Patent is:—

1. Safety suspension gear for cages and hoists, comprising in combination, a pair of rectangularly apertured guide pillars extending from top to bottom of the shaft on opposite sides of the cage or hoist, an open channel member fixed transversely on the top of the cage or hoist in a position directly between said guide pillars, a pair of rectangular bolts slidably mounted within opposite extremities of said channel member and engageable with said guide pillars, said channel member having a central pair of rectangular longitudinal slots in its opposite side flanges, a pair of arcuate blade springs, disposed in opposite facial relation and hinged together at their opposite extremities, supported horizontally within said slots so as to abut against the spaced-apart inner extremities of said bolts, and a chain connection between said bolts and the winding rope whereby the bolts are normally contracted inwardly towards each other by the weight of the cage or hoist and against the outward pressure of said springs.

2. Safety suspension gear as claimed in claim 1, and including in combination, a channel member fixed transversely beneath the cage or hoist, a pair of rectangular bolts slidably mounted within opposite extremities of said lower channel member so as also to be engageable with said guide pillars, a pair of upright shafts rotatably mounted towards opposite sides in front and rear of the cage or hoist, and radius lever connections between the upper and lower extremities of said shafts and the respective upper and lower bolts, whereby the relative disposition of the lower pair of bolts is controlled in accordance with that of the upper pair.

In witness whereof I have hereunto set my hand.

THOMAS MORRIS.